United States Patent
Moon et al.

(10) Patent No.: US 11,891,346 B2
(45) Date of Patent: *Feb. 6, 2024

(54) HORTICULTURE ADDITIVE

(71) Applicant: Milliken & Company, Spartanburg, SC (US)

(72) Inventors: Nicholas G. Moon, Greer, SC (US); Shirley A. Whiteside, Chesnee, SC (US); Dominick J. Valenti, Moore, SC (US); Adam J. Newberry, Greer, SC (US); Sanjeev K. Dey, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 408 days.

This patent is subject to a terminal disclaimer.

(21) Appl. No.: 17/024,750

(22) Filed: Sep. 18, 2020

(65) Prior Publication Data

US 2021/0101846 A1    Apr. 8, 2021

Related U.S. Application Data (60) Provisional application No. 62/910,540, filed on Oct. 4, 2019.

(51) Int. Cl.
*C05F 11/00*     (2006.01)
*C08G 65/08*     (2006.01)

(52) U.S. Cl.
CPC .............. *C05F 11/00* (2013.01); *C08G 65/08* (2013.01)

(58) Field of Classification Search
None
See application file for complete search history.

(56) References Cited

U.S. PATENT DOCUMENTS

| | | |
|---|---|---|
| 3,798,838 A | 3/1974 | Hashimoto |
| 4,241,537 A | 12/1980 | Wood |
| 4,380,886 A | 4/1983 | Koslow |
| 4,404,013 A * | 9/1983 | Rainbow .............. A01G 24/28 516/200 |
| 4,540,427 A | 9/1985 | Helbling |
| 5,616,811 A | 4/1997 | Vipond |

(Continued)

FOREIGN PATENT DOCUMENTS

| | | |
|---|---|---|
| JP | H11256160 | 9/1999 |
| JP | H11289861 | 10/1999 |

(Continued)

OTHER PUBLICATIONS

International Search Report for App. No. PCT/US2020/053002, dated Jan. 29, 2021, 7 pages.

(Continued)

*Primary Examiner* — Wayne A Langel
(74) *Attorney, Agent, or Firm* — Brenda D. Amidon (57) ABSTRACT

This invention relates to a horticulture additive comprising: (1) a wetting agent, wherein the wetting agent is a multi-branched polymer comprising at least one of an oxygen-containing and a nitrogen-containing polyfunctional base compound having at least three branches attached thereto, and (2) a humectant. The horticulture additive is advantageous for increasing plant survival of plants treated therewith when exposed to reduced watering conditions.

28 Claims, 4 Drawing Sheets

(56) References Cited

U.S. PATENT DOCUMENTS

| | | | |
|---|---|---|---|
| 5,841,123 A | 11/1998 | Thorigne | |
| 6,948,276 B2* | 9/2005 | Petrea | C09K 17/18 47/58.1 SC |
| 7,587,857 B2 | 9/2009 | Petrea | |
| 9,309,462 B1 | 4/2016 | Curtis | |
| 2002/0042346 A1* | 4/2002 | Hamersky | C05G 3/60 514/772.4 |
| 2003/0162842 A1 | 8/2003 | Gross | |
| 2005/0193791 A1 | 9/2005 | Petrea | |
| 2014/0352212 A1 | 12/2014 | Irwin | |
| 2017/0240481 A1* | 8/2017 | Blankenburg | C05D 9/00 |
| 2017/0347663 A1 | 12/2017 | Huang | |

FOREIGN PATENT DOCUMENTS

| | | | |
|---|---|---|---|
| WO | 0107398 | 2/2001 | |
| WO | WO 2015001391 A1 * | 2/2015 | C05G 3/08 |
| WO | 2016210100 | 12/2016 | |
| WO | WO 2017/116646 A1 * | 7/2017 | C07D 333/38 |
| WO | 2017134595 | 8/2017 | |
| WO | 2019057517 | 3/2019 | |

OTHER PUBLICATIONS

Air Products, Tomadol ethoxylated alcohols and Nonidet alkoxylated surfactants, obtained online at: https://www.jrhessco.com/wp-content/uploads/2012/02/tomadol-datasheet.pdf, downloaded on Jan. 13, 2023. (Year: 2012).

Hadjichristidis, N., et al. "6.03-Polymers with star-related structures: Synthesis, properties, and applications." Polymer Science: A Comprehensive Reference; Matyjaszewski, K., Möller M., Eds (2012) 29-111. (Year: 2012).

International Preliminary Report on Patentability issued in App. No. PCT/US2020/053002, dated Apr. 5, 2022, 10 pages.

International Preliminary Report on Patentability issued in App. No. PCT/US2020/053004, dated Apr. 14, 2022, 10 pages.

International Search Report for App. No. PCT/US2020/053004, dated Feb. 4, 2021, 6 pages.

Odian, George. Principles of polymerization, fourth edition. John Wiley & Sons, 2004. p. 324.

* cited by examiner

United States Patent US 11,891,346 B2

HORTICULTURE ADDITIVE

CROSS REFERENCE TO RELATED APPLICATIONS

This application claims priority to U.S. Provisional Patent Application No. 62/910,540, entitled "Horticulture Additive," which was filed on Oct. 4, 2019, and is entirely incorporated by reference herein.

TECHNICAL FIELD

This invention relates to a horticulture additive comprising: (1) a wetting agent, wherein the wetting agent is a multi-branched polymer comprising at least one of an oxygen-containing and a nitrogen-containing polyfunctional base compound having at least three branches attached thereto, and (2) a humectant. The horticulture additive is advantageous for increasing plant survival of plants treated therewith when exposed to reduced watering conditions.

BACKGROUND

Maintaining plant survival during transportation from nurseries to stores is often challenging because the ability to apply water to the plants during this time period is generally not possible. Sporadic watering at the stores often occurs as well, further stressing the life of the plant. The planting medium used by most nurseries is primarily based on peat. Peat is used because it absorbs a large quantity of water and dries relatively slowly. However, when peat is dried below around 30% water, it becomes extremely hydrophobic and difficult to rewet. As such, much of the water that is delivered on subsequent watering will simply channel around the sides of the pot, leaving the internal planting medium dry. This makes it very difficult for the plant to revive once the peat has dried due to infrequent watering.

Improving moisture management in planting medium of nursery pots may be accomplished in three major ways. The first is the retardation of the moisture loss upon drying. The second is the improved rewetting of the planting medium after it has dried out, especially if it has been allowed to over dry, and the third is increasing the water content absorbed by the planting medium upon watering.

The present invention addresses the rewetting of the planting medium once the planting medium has dried. The horticulture additive provides improved longevity on the planting medium (e.g. peat material). As such, it provides not only improved rewetting the first time it is used, but also similarly good rewetting with multiple watering events. A further advantage of the horticulture additive is that it can be applied once and provide protection against hydrophobization of the planting medium even after multiple watering events. A humectant is able to absorb moisture from the atmosphere, increasing the available moisture near the roots and making it available to the plants. Treating plants with this additive prior to transportation leads to increased plant survival under reduced watering conditions by slowing the rate of moisture loss and/or improving the amount and evenness of moisture absorbed on subsequent watering events. Therefore, the horticulture additive of the present invention represents an advancement over the prior art.

BRIEF SUMMARY

In one aspect, the invention relates to a horticulture additive formulation comprising: (a) a wetting agent, wherein the wetting agent is a multi-branched polymer comprising an oxygen-containing or nitrogen-containing polyfunctional base compound and at least three branches attached thereto, wherein at least one branch includes at least one hydrophilic and one hydrophobic constituent, and (b) a humectant.

In another aspect, the invention relates to a method for improving plant health/survival comprising the steps of: (a) providing a horticulture additive formulation comprising: (i) a wetting agent, wherein the wetting agent is a multi-branched polymer comprising an oxygen-containing or nitrogen-containing polyfunctional base compound and at least three branches attached thereto, wherein at least one branch includes at least one hydrophilic and one hydrophobic constituent, and (ii) a humectant; (b) providing at least one plant, wherein the at least one plant is contained within a planting medium; and (c) applying the horticulture additive formulation to the planting medium.

In a further aspect, the invention relates to a system for improving the health/survival of a plant, the system comprising: (1) a horticulture additive formulation comprising: (a) a wetting agent, wherein the wetting agent is a multi-branched polymer comprising an oxygen-containing or nitrogen-containing polyfunctional base compound and at least three branches attached thereto, wherein at least one branch includes at least one hydrophilic and one hydrophobic constituent, and (b) a humectant; (2) a planting medium; and (3) at least one plant containing within the planting medium.

In yet another aspect, the invention relates to a planting medium containing a horticulture additive formulation comprising: (a) a wetting agent, wherein the wetting agent is a multi-branched polymer comprising an oxygen-containing or nitrogen-containing polyfunctional base compound and at least three branches attached thereto, wherein at least one branch includes at least one hydrophilic and one hydrophobic constituent, and (b) a humectant.

In a further aspect, the invention relates to a horticulture additive formulation comprising: (a) a wetting agent, wherein the wetting agent is a multi-branched polymer comprising an oxygen-containing and a nitrogen-containing polyfunctional base compound and at least three branches attached thereto, wherein each branch includes at least one hydrophilic and one hydrophobic constituent, and (b) a humectant.

In another aspect, the invention relates to a method for improving plant health/survival comprising the steps of: (a) providing a horticulture additive formulation comprising: (i) a wetting agent, wherein the wetting agent is a multi-branched polymer comprising an oxygen-containing and a nitrogen-containing polyfunctional base compound and at least three branches attached thereto, wherein at least one branch includes at least one hydrophilic and one hydrophobic constituent, and (ii) a humectant; (b) providing at least one plant, wherein the at least one plant is contained within a planting medium; and (c) applying the horticulture additive formulation to the planting medium.

In a further aspect, the invention relates to a system for improving the health/survival of a plant, the system comprising: (1) a horticulture additive formulation comprising: (a) a wetting agent, wherein the wetting agent is a multi-branched polymer comprising an oxygen-containing and a nitrogen-containing polyfunctional base compound and at least three branches attached thereto, wherein at least one branch includes at least one hydrophilic and one hydrophobic constituent, and (b) a humectant; (2) a planting medium; and (3) at least one plant containing within the planting medium.

In yet another aspect, the invention relates to a planting medium containing a horticulture additive formulation comprising: (a) a wetting agent, wherein the wetting agent is a multi-branched polymer comprising an oxygen-containing and a nitrogen-containing polyfunctional base compound and at least three branches attached thereto, wherein at least one branch includes at least one hydrophilic and one hydrophobic constituent, and (b) a humectant.

DETAILED DESCRIPTION

The present invention described herein is a horticulture additive comprising: (1) a wetting agent, wherein the wetting agent is a multi-branched polymer comprising at least one of an oxygen-containing and a nitrogen-containing polyfunctional base compound having at least three branches attached thereto, and (2) a humectant. The horticulture additive is advantageous for increasing plant survival of plants treated therewith when exposed to reduced watering conditions.

As used herein, the term "soil-free" is intended to describe various organic materials such as peat moss, sphagnum peat, sedge peat, bark, and the like, and mixtures thereof. In the horticulture industry, soil-free mixtures are sometimes referred to as "soilless." Inorganic components, such as vermiculite, may also be included in the soil-free/soilless mixtures.

As used herein, the term "star polymer" is intended to refer to a polymer that contains polymer chains as arms emanating from a branch point. A description is provided in the following referenced textbook: Odian, George. *Principles of Polymerization*; John Wiley & Sons: Hoboken, 2004 (page 324).

As used herein, the term "hydrophilic" is intended to mean having a strong affinity for or the ability to absorb water. The term "hydrophobic" is intended to mean lacking the affinity for or the ability to absorb water. The hydrophobicity of an article is principally evaluated by how a liquid interacts with the surface of a material. In one aspect of the invention, hydrophobic is intended to describe any material or compound that absorbs less water than polyethylene glycol.

The inventive additive formulation, in terms of composition, thus includes at least one multi-branched oxygen-containing polyfunctional compound-based wetting agent. Such a polyfunctional compound may be a polyol, a polycarboxylic acid, a lactone (the ring structure of which will open upon reaction to provide the necessary reactive sites for branch addition thereto), or mixtures thereof, wherein the moieties include highly reactive end groups for reaction with groups (such as surfactants) to form the desired branches therein. In such a base compound, the oxygen-containing functionalities (oxygen alone, or as part of a carboxylic acid group) provide the reactive sites and thus act as linking groups between the base compound and the branches (which may be surfactant-containing).

Alternatively, in cases where both oxygen-containing functionalities and nitrogen-containing functionalities are present, such as in amino acids, both functionalities may provide reactive sites which act as linking groups between the base compound and the polymer branches. Examples of polyfunctional compounds having both oxygen-containing and nitrogen-containing functionalities include mono-alkanolamines, di-alkanolamines, amino acids, amino alcohols, and mixtures thereof. Further specific examples include ethanolamine, di-ethanolamine, and mixtures thereof.

The term polyol, for this invention, basically covers any compound with at least three hydroxyl moieties thereon. Likewise, polycarboxylic acid encompasses compounds having at least three such acid moieties present thereon. Lactone is a heterocyclic compound with at least two oxygen groups thereon. Amino acid generally encompasses any of the 20 amino acids having a carboxylic acid and an amino functional group attached to the same tetrahedral carbon atom.

Thus, particular classes of polyols suitable for this purpose include, without limitation, tri- to octa-hydric alcohols such as pentaerythritol, diglycerol, α-methylglucoside, sorbitol, xylitol, mannitol, erythritol, dipentaerythritol, arabitol, glucose, sucrose, maltose, fructose, mannose, saccharose, galactose, leucrose, and other alditol or sugar molecules or polysaccharides; polybutadiene polyols; castor oil-derived polyols; epoxidized triglyceride polyols; hydroxyalkyl methacrylate copolymers; hydroxyalkyl acrylate polymers; polyvinyl alcohols; glycerine; 1,1,1-trimethylolpropane; 1,1,1-trimethylolethane; 1,2,6-hexanetriol; butanetriol; and mixtures thereof. Potentially preferred base compounds are the alditol types, particularly sorbitol and sucrose.

Suitable polycarboxylic acids include, without limitation, tartaric acid; citric acid; ascorbic acid; 2-phosphono-1,2,4-butane tricarboxylic acid; glucuronic acid; ethylenediaminetetraacetic acid; gluconic acid; cyclohexane hexacarboxylic acid; mellitic acid; saccharic acid; mucic acid; diethylenetriamine pentaacetic acid; glucoheptonic acid; lactobionic acid; 3,3',4,4'-benzophenone tetracarboxylic acid; amino propyl trimethoxysilane; aminopropyltriethoxysilane; 3-glycidoxypropyltrimethoxy silane; 3-glycidoxypropyltriethoxysilane; 3-(triethoxysilyl)propyl isocyanate; 3-(trimethoxysilyl)propyl isocyanate; diaminopropane-N,N,N',N'-tetraacetic acid; aconitic acid; isocitric acid; 1,2,3,4-butanetetracarboxylic acid; nitrilotriacetic acid; tricarballylic acid; N-(phosphonomethyl)iminodiacetic acid; 3-[[tris(hydroxymethyl)methyl]amino]-1-propanesulfonic acid; 2-[[tris(hydroxymethyl)methyl]amino]-1-ethanesulfonic acid; 3-[bis(2-hydroxyethyl)amino]-2-hydroxy-1-propane-sulfonic acid; 3-[N-trishydroxymethylmethylamino]-2-hydroxypropanesulfonic acid; N-tris[hydroxymethyl]methyl-4-aminobutanesulfonic acid; 3-aminoadipic acid; 1,3-diamino-2-hydroxypropane-N,N,N',N'-tetraacetic acid; triethylenetetraaminehexaacetic acid; β-carboxyaspartic acid; α-hydroxymethylaspartic acid; tricine; 1,2,3,4-cyclopentanetetracarboxylic acid; 6-phosphogluconic acid; and mixtures thereof.

Suitable lactones include, without limitation, glucoheptonic lactone and glucooctanoic-γ-lactone. Suitable amino acids include, without limitation, aspartic acid, α-glutamic acid, and β-glutamic acid.

While it has been disclosed that the inventive additive formulation includes at least one multi-branched oxygen-containing polyfunctional compound-based wetting agent, yet another embodiment of the invention includes the use of at least one multi-branched oxygen-free polyamine compound-based wetting agent. The oxygen-free polyamine compound-based wetting agent contains at least three amine moieties, and it is believed that the amine moieties provide multiple highly reactive nitrogen-containing end groups for reaction with surfactant-like groups to form the desired branches therein. Thus, instead of reactive sites comprising oxygen-containing groups alone, or the combination of oxygen-containing and nitrogen-containing groups, as disclosed above, it is possible that nitrogen-containing groups alone can also be used as reactive sites which act as linking groups between the base compound and the surfactant-like branches. Examples of such oxygen-free polyamine compound-based wetting agents include, without limitation, ammonia, ethylenediamine, diethylenetriamine, triethylenetetramine, tetraethylenepentamine, pentaethylene hexamine, branched polyethyleneimine, linear polyethyleneimine, polyvinylamine, and mixtures thereof.

The synthesis of the wetting agents thus includes the reaction of surfactant-type compounds (which possess both hydrophobic and hydrophilic moieties) with the reactive (or functional) sites of the polyfunctional base compound. Thus, the wetting agent initially exists as a single compound (having both hydrophobic and hydrophilic moieties within each branch, and thus within the entire compound), and subsequently, after application to target hydrophobic substrates, may degrade into separate, individual surfactants free from the polyfunctional base compound. As a result, the wetting agent exhibits excellent ability to provide the necessary water adhesion to the hydrophobic surface of the water repellent plant growth media. The increased number of surfactant branches may also improve binding between the surfactant and the soil surface due to the larger number of binding sites per molecule.

It is generally believed, without being bound to any theory, that this occurs through contact of the hydrophobic groups of the surfactant itself with the hydrophilic groups, which are free to provide the beneficial wetting characteristics, and, even upon such above-noted degradation, will still exhibit continued, effective wetting, and thus water transport, through the hydrophobic material. Any adhered water droplets will typically be pulled into the hydrophobic plant growth media via adhesion by other particles or through cohesion with other water droplets. Thus, such a wetting agent effectively permits appreciable and necessary amounts of moisture to penetrate the surface for beneficial moisture supply to the subterranean roots on a consistent and continuous basis for a relatively long period of time. As noted previously, the multi-branched aspect of this compound permits degradation of the compound without losing any appreciable ability to provide continued wetting characteristics within the targeted materials. Thus, use of the inventive additive formulation accords consistent and effective wetting and moisture penetration without any need for further labor-intensive and costly repeated applications of treatment formulations.

The hydrophilic constituent may be a polyalkylene oxide moiety. In one aspect of the invention, the polyalkylene oxide moiety is ethylene oxide. The hydrophobic constituent may be selected from the group consisting of alkylene oxide, polyalkylene oxide, alkyl ether, aryl ether, heteroaryl ether, alkyl ester, aryl ester, and mixtures thereof. The polyalkylene oxide may be selected from the group consisting of propylene oxide, butylene oxide, and mixtures thereof.

In one aspect of the invention, the wetting agent may be chosen from the class of compounds that are alditol-based, thus having five or more free oxygen groups for reaction with surfactant-type constituents to form the desired multiple branches thereon. Upon degradation of any or all such resultant oxygen linkages, the free constituents, as noted above, exhibit the necessary surfactant-like wetting benefits on a continuous basis. The branched wetting agents may further be selected from those disclosed in commonly owned U.S. Pat. No. 6,948,276 to Petrea et al. The branches can also be capped with functional groups selected from the group consisting of ethers, esters, halogens, sulfonates, phosphates, carboxymethylates, alkyl, alkyl oxide, aryl, aryl oxide, and mixtures thereof.

The following compounds may be suitable for use in synthesizing the wetting agent. Basically, surfactant-type compounds are reacted with the free oxygens of the alditol base structure. This can be accomplished in any number of ways, most notably through the alkoxylation of polyfunctional reactive hydrogen-containing materials. Each reactive hydrogen-containing site typically includes alkylene oxide moieties, such as, for instance, ethylene oxide (EO; a/k/a ethyleneoxy), propylene oxide (PO; a/k/a propyleneoxy), and/or, butylene oxide (BO; a/k/a butyleneoxy) in a ratio of EO:PO or BO of from about 5:95 to about 95:5. The combined molecular weight of EO+PO or BO is generally from about 300 to about 20,000, and more preferably from about 500 to about 15,000, such that each branch becomes a typical wetting species. As the molecule biodegrades in the soil-free substructure, preferentially at the polyfunctional starting point as noted above, a new branch of the wetting agent is introduced into the material for long-term performance.

Each of the possible variations for producing the multi-branched wetting agents provides the requisite water transport discussed previously, with the alditol-based types potentially preferred due to ease of manufacture and ease in degrading into constituent parts at a relatively controlled and consistent pace.

The horticulture additive formulation further includes at least one humectant. A humectant is a hydroscopic material capable of absorbing and retaining water through the formation of hydrogen bonds with water. Examples of humectants include, but are not limited to, glycerin, saccharides, substituted and unsubstituted poly(ethylene glycol), polyol alkoxylates, neutralized polyacrylic acids, polyacrylamides, polysaccharides, and poly(propylene glycols).

In one aspect of the invention, the humectant is polyethylene glycol. The polyethylene glycol may be further characterized by having a molecular weight in the range from about 200 to about 5000, or in the range from about 200 to about 1000, or in the range from about 200 to about 800, or in the range from about 300 to about 600. In one aspect of the invention, the polyethylene glycol has a molecular weight of about 400.

One or more additional components may be optionally included in the horticulture additive formulation. These additional components may be selected from penetrants, inert ingredients, auxiliary ingredients, and combinations thereof. Penetrants are typically low molecular weight surfactants used to improve penetration of the solution through the plant canopy and into the soil. As used herein, penetrants are also characterized as compounds (such as surfactants) that actively lower the surface tension of water. Examples of compounds that actively lower the surface tension of water (i.e. penetrants) include, but are not limited to, alkoxylated alcohols, alkoxylated fatty acids, alkoxylated fatty amines, alkoxylated fatty amides, phosphated fatty alcohols, sulfated fatty alcohols, phosphated ethoxylated fatty alcohols, sulfated ethoxylated fatty alcohols, alkylpolyglycosides, alkoxylated alkylphenols, alkoxylated naphthols, silicone surfactants, fluorocarbon surfactants and mixtures of the above surfactants.

Inert ingredients include, but are not limited to, water, propylene glycol, dipropylene glycol, block copolymers of ethylene oxide and propylene oxide, glycerin, or other compounds used to compatibilized the other components in the formulation, and mixtures thereof. The formulation may also optionally include other auxiliary ingredients designed to enhance the aesthetic appearance or improve plant health such as a plant nutrient and/or micronutrient, a plant growth regulator, biologicals, biostimulants, a colorant, a fungicide, an insecticide, a fertilizer, and the like, and mixtures thereof.

In one aspect of the invention, all components of the horticulture formulation are blended and mixed together at room temperature until homogenized. Typically, the wetting agent and the humectant are mixed, followed by addition of a compatibilizer (if needed) and finally water (if needed) until a clear solution is obtained. The compatibilizer may be selected from the group consisting of water, alcohols, glycerin, propylene glycol, dipropylene glycol, polypropylene glycol, ethylene glycol, diethylene glycol, polyethylene glycol, alkoxylated polyols, and organic solvents and mixtures thereof.

In the case of emulsions of the polyacrylic acid ("PAA"), the PAA is neutralized with a basic compound such as, but not limited to, alkaline metal hydroxides, alkaline metal alkoxides, alkaline earth metal hydroxides, and amines. This neutralization can occur either before or after the PAA is mixed with other ingredients such as the wetter and water.

In one aspect of the invention, the horticulture additive is comprised of an alditol-based wetting agent with about 50-80% PO blended with polyethylene glycol (e.g. PEG-400) as a humectant in a 1:1 ratio along with 10% dipropylene glycol and 5% water. The horticulture additive thus produced is a homogenous solution.

In a further aspect of the invention, the horticulture additive is comprised of an alditol-based wetting agent with about 50-80% PO and blended with polyacrylic acid (25 wt %) (250,000 g/mol) in a 1:1 ratio neutralized with a base (e.g. KOH). The horticulture additive thus produced forms a relatively stable emulsion.

In a further aspect of the invention, the horticulture additive is comprised of an alditol-based wetting agent with about 50-80% PO and an internal EO block blended with polyethylene glycol (e.g. PEG-400) as a humectant in a 5:1 ratio, along with 1-10% of an alkoxylated fatty alcohol penetrant and 10-20% dipropylene glycol.

The horticulture additive formulation may be comprised of wetting agent in the range from about 1 to about 99 by weight and humectant in the range from about 99 to about 1 by weight, or wetting agent in the range from about 40 to about 90 by weight and humectant in the range from about 10 to about 60 by weight, or even wetting agent in the range from about 60 to about 80 by weight and humectant in the range from about 30 to about 10 by weight, with the remainder of the additive formulation comprised of a mix of possible additional components as noted herein.

Mechanism of delivery for the horticulture additive includes direct application to the plant and/or to the planting medium. The horticulture additive may be diluted with water to form an aqueous solution which is subsequently added directly to the plant and/or to the planting medium. The horticulture additive may also be loaded onto a water soluble or insoluble granule, injected into the soil system, or absorbed through the bottom of the plant pot. Insoluble granules can include vermiculite, zeolites, carbon materials, urea-formaldehyde polymers, corn husks, or any other high surface-area solid.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

EXAMPLES

The following Examples are provided for illustration purposes and should not be considered as limiting the scope of the invention. These Examples are intended to demonstrate the wetting and re-wetting ability of organic material treated with the horticulture additive formulation of the current invention.

Example 1

70—Sucrose/glycerin 14000 40/20/40
5—Syn Lube 6485 (Available from Milliken & Company)
15—Poly(ethylene glycol) 400 g/mol
10—Dipropylene glycol

Example 2

67.5—Sorbitol 8000 70/30
3.8—Syn Fac TDA-92 (Available from Milliken & Company)
15—Poly (ethylene glycol) 400 g/mol
10—Dipropylene glycol
1.2—Water

Example 3

70—Glycerin 6000 40/20/40
5—Syn Lube 6485 (Available from Milliken & Company)
15—Poly(ethylene glycol) 400 g/mol
10—Dipropylene glycol Organic sphagnum peat moss was sifted to remove large material and dried in an oven overnight at 65° C. After drying, the peat moss contained about 5% moisture. Ten grams of the peat moss was weighed into a 150 mL plastic cup with three holes drilled into the bottom. The mass of the cup containing the dried peat moss was recorded. A 50-gram solution that contained 0.5% of either Examples 1, 2, or 3 was poured over the dried peat moss. The time it took for the liquid level to move beneath the surface of the soil was recorded as the drain time. The cup was left to drip. After the dripping stopped (approximately 10 minutes) the cup was reweighed to determine the amount of the 50 g solution retained by the peat moss.

Next, the cups containing the samples were dried for 24 hours at 65° C. and the process described above was repeated using only 50 grams of DI water. Each exposure to 50 grams of DI water was a wash cycle. This process was repeated until the time it took to drain below the soil surface exceeded 10 minutes on three separate occasions or 15 cycles, whichever was achieved first ("#Rewet").

Comparative Example 1—Linear Alkoxylate without Humectant

Organic sphagnum peat moss was sifted to remove large material and dried in an oven overnight at 65° C. After drying, the peat moss contained about 5% moisture. Ten grams of the peat moss was weighed into a 150 mL plastic cup with three holes drilled into the bottom. The mass of the cup containing the dried peat moss was recorded. A 50-gram solution that contained 0.5% Aquagro L (Comparative Example 1, available from Aquatrols® of Paulsboro, NJ) was poured over the dried peat moss. The time it took for the liquid level to move beneath the surface of the soil was recorded as the drain time. The cup was left to drip. After the dripping stopped (approximately 10 minutes) the cup was reweighed to determine the amount of the 50 g solution retained by the peat moss.

Next, the cups containing the samples were dried for 24 hours at 65° C. and the process described above was repeated using only 50 grams of DI water. Each exposure to 50 grams of DI water was a wash cycle. This process was repeated until the time it took to drain below the soil surface exceeded 10 minutes on three separate occasions or 15 cycles, whichever was achieved first ("#Rewet").

Comparative Example 2—Branched Alkoxylate without Humectant: Sorbitol 14000 40/20/40 Block Organic sphagnum peat moss was sifted to remove large material and dried in an oven overnight at 65° C. After drying, the peat moss contained about 5% moisture. Ten grams of the peat moss was weighed into a 150 mL plastic cup with three holes drilled into the bottom. The mass of the cup containing the dried peat moss was recorded. A 50-gram deionized ("DI") water solution that contained 0.5% of Comparative Example 2 was poured over the dried peat moss.

The time it took for the liquid level to move beneath the surface of the soil was recorded as the drain time. The cup was left to drip. After the dripping stopped (approximately 10 minutes) the cup was reweighed to determine the amount of the 50 g solution retained by the peat moss.

Next, the cups containing the samples were dried for 24 hours at 65° C. and the process described above was repeated using only 50 grams of DI water. Each exposure to 50 grams of DI water was a wash cycle. This process was repeated until the time it took to drain below the soil surface exceeded 10 minutes on three separate occasions or 15 cycles, whichever was achieved first ("#Rewet").

Figure 1:
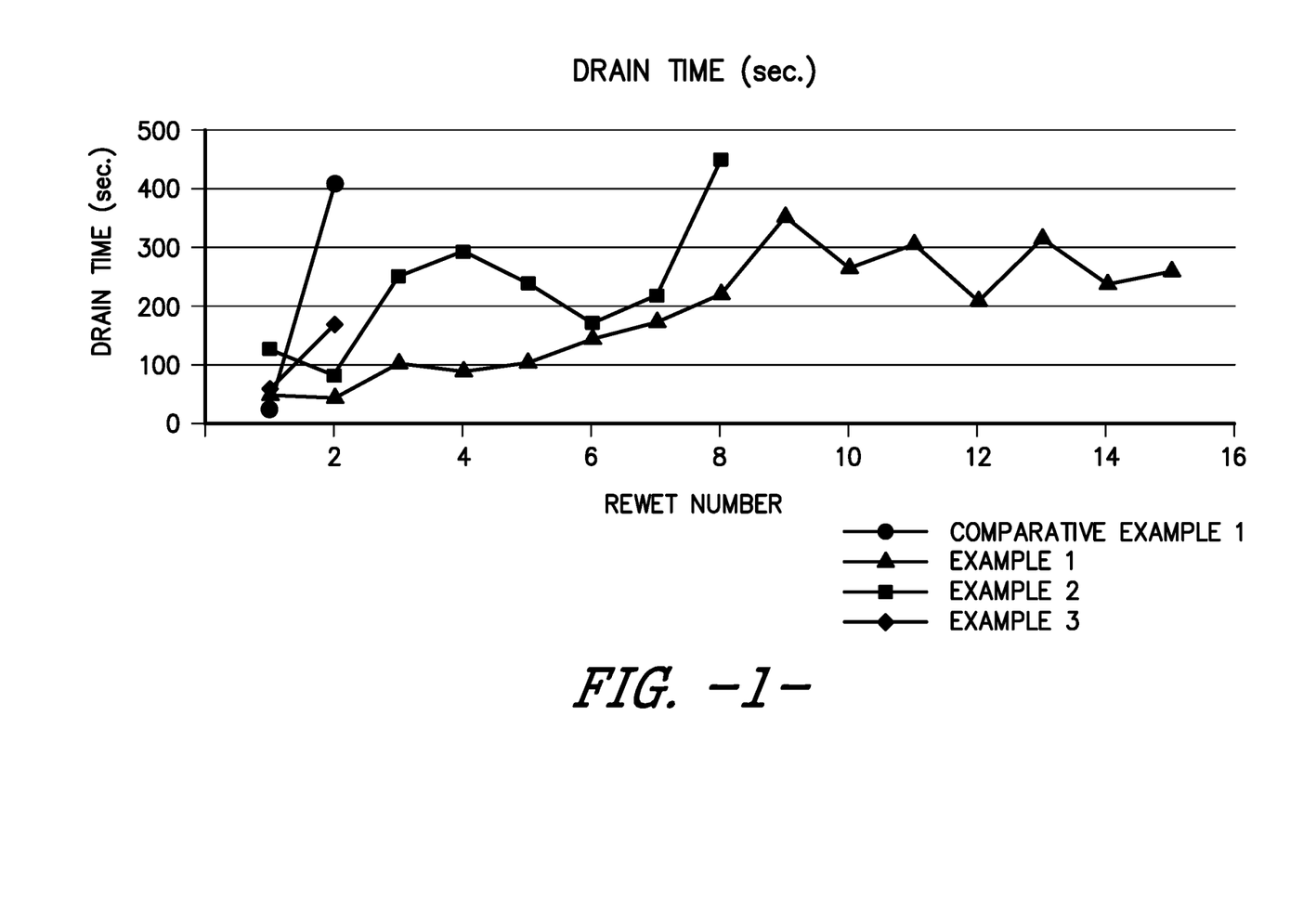
FIG. 1 is a line graph illustrating drain time versus number of rewets for Examples 1 to 3 and Comparative Example 1.

FIG. 1 shows the differential behavior of the horticulture additive of the present invention which contains a multi-branched polymer and humectant (Examples 1-3) compared with a linear wetting agent and no humectant (Comparative example 1). Comparative Example 1 showed a drain time in excess of 10 minutes after the second rewet. The drain time for Example 1 rose slowly with rewet cycles, but never reached the 10 minute drain time. The drain time for Example 2 rose more quickly than Example 1, but still took many more cycles to reach a drain time of 10 minutes. Example 3 reached a drain time of 10 minutes in a comparable time as Comparative Example 1, but the time was lower than Comparative Example 1 before failure.

Figure 2:
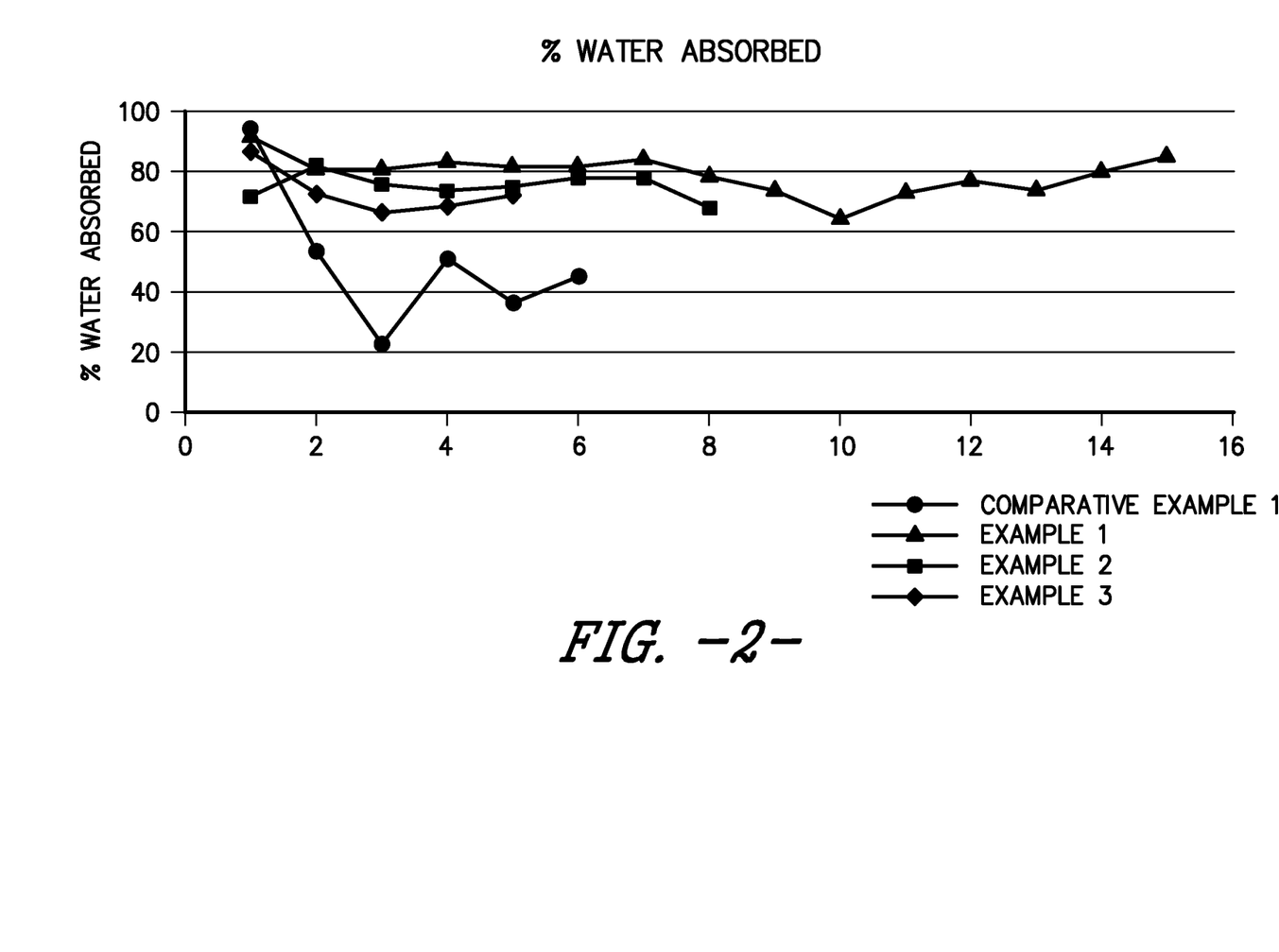
FIG. 2 is a line graph illustrating percent water absorbed versus number of rewets for Examples 1 to 3 and Comparative Example 1.

FIG. 2 shows the % of the water that was absorbed for each rewet cycle. Examples 1-3 all showed improved moisture absorption for each rewet relative to Comparative Example 1. Even Example 3, which had a long drain time, still showed improved moisture retention over Comparative Example 1.

Figure 3:
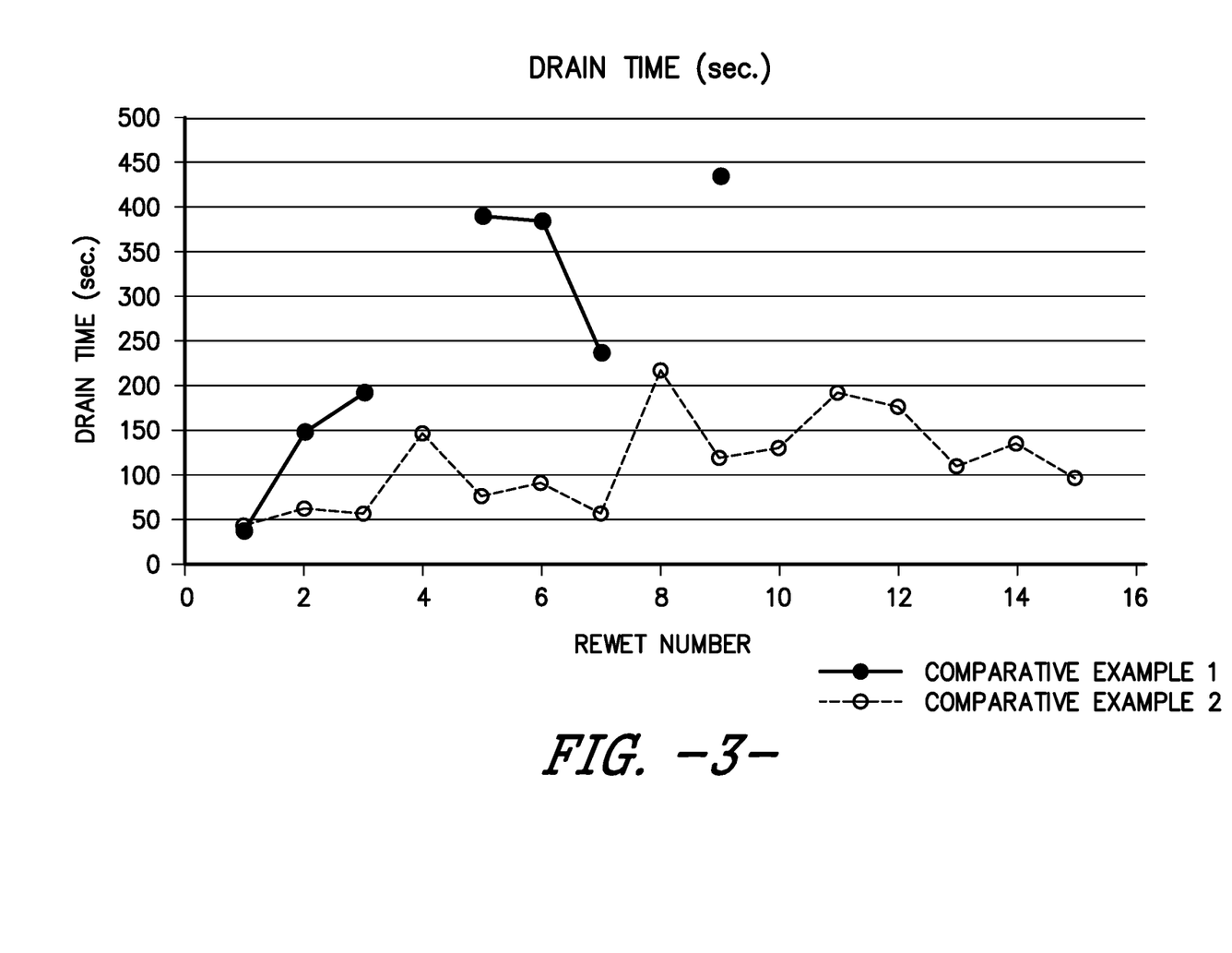
FIG. 3 is a line graph illustrating drain time versus number of rewets for Comparative Example 1 and Comparative Example 2.

FIG. 3 shows the drain times for the tests described above, comparing the performance of Comparative Example 1 (linear uncapped alkoxylate, no humectant) and Comparative Example 2 (multi-branched polymer wherein the branches are arranged in a star configuration, with no humectant). Comparative Example 1 began failing the test at drain time greater than 600 seconds after the fourth wash cycle. By the ninth wash cycle, Comparative Example 1 was failing consistently. Comparative Example 2 showed a small increase in drain time after the first few washes, but it remained consistently below that observed by Comparative Example 1 even after 15 washes.

Figure 4:
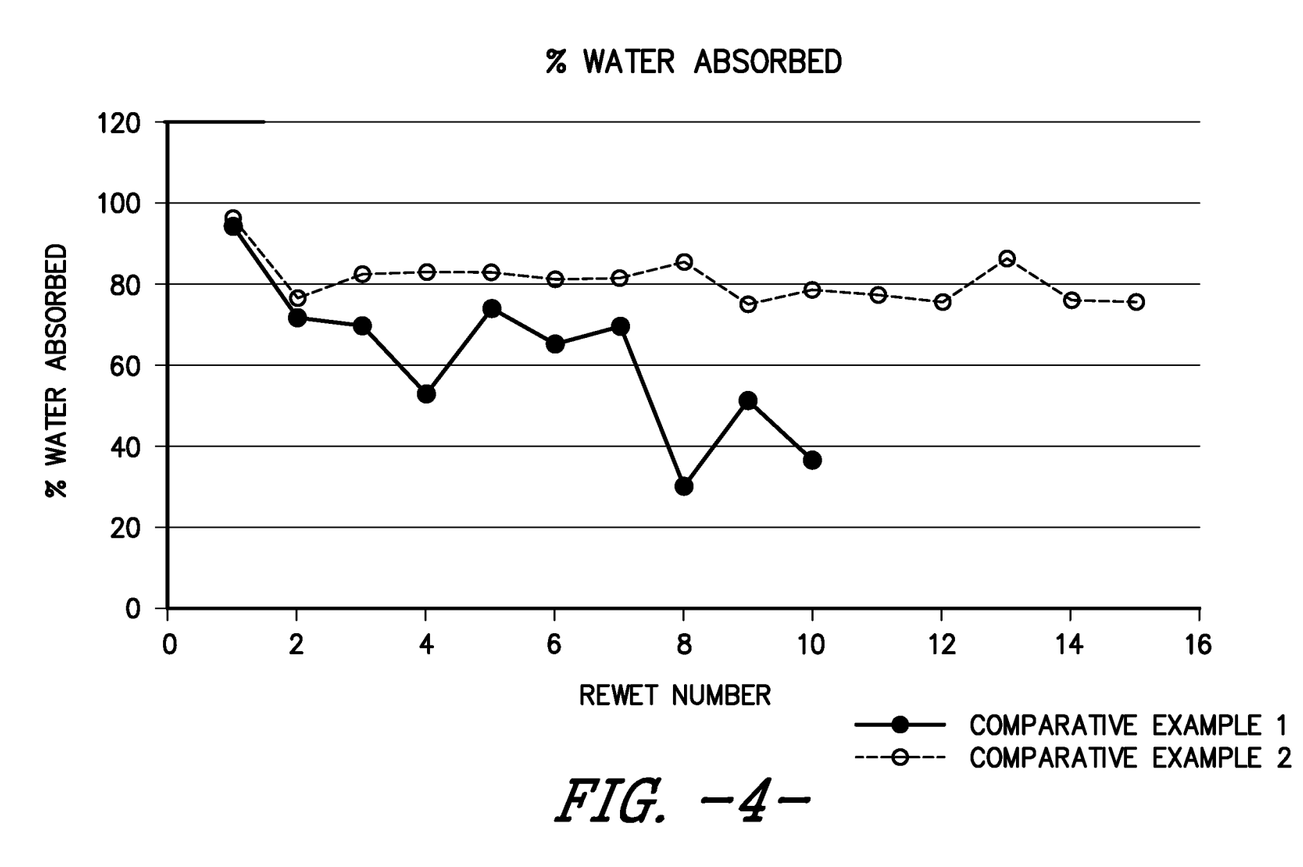
FIG. 4 is a line graph illustrating percent water absorbed versus number of rewets for Comparative Example 1 and Comparative Example 2.

FIG. 4 shows the weight percent water absorbed by the peat moss (relative to 50 g added) over multiple washes. Test results illustrate there was a steady decline in the amount of water absorbed by the peat moss treated with Comparative Example 1. As the number of washes increased, the % absorbed becomes very noisy. This is because the water can spend a highly variable amount of time on the peat. If it channels, the absorption will be very low, but if the water sits on the top of the peat for a long time, more will be absorbed. Peat moss treated with Comparative Example 2 remains very consistent in the moisture absorption, even after 13 flushes. Soilless mixes treated with these types of wetting agents consistently maintain high moisture content even after repeated watering cycles.

Comparative Examples 3A to 3E

Comparative Example 3A—Sorbitol 8000 25/50/25 Block

Comparative Example 3B—Sorbitol 8000 10/80/10 Block

Comparative Example 3C—Sorbitol 8000 80/20 Block

Comparative Example 3D—Sorbitol 8000 50/50 Block

Comparative Example 3E—Sorbitol 8000 20/80 Block

Further testing was done to evaluate the effectiveness of peat moss rewetting. Numerous branched surfactants were measured to probe the role of polymer structure on the wetting time. A variety of sorbitol-based surfactants were tested.

Dried peat moss was placed in a plastic bag and water with a dissolved wetting agent was added in a 3:1 w:w of water:peat. The bag was partially inflated and shaken vigorously to fully wet out the peat. The peat was given 2 hours to wet and then transferred to a pan to dry in an oven overnight at 65° C. Once dry, a teaspoon amount of the peat was placed on the top of a beaker with 100 mL of DI water. The time required for the peat to rewet completely was measured. Test results are provided in Table 1.

TABLE 1

Effect of PO Placement on Peat Moss Rewetting

| Sample | Time to Rewet (seconds) |
|---|---|
| Control (DI water) | >420 |
| Comparative Example 2 | 143 +/− 28 |
| Comparative Example 3A | >420 |
| Comparative Example 3B | >420 |
| Comparative Example 3C | 302 +/− 17 |
| Comparative Example 3D | 407 +/− 24 |
| Comparative Example 3E | >420 |
| Comparative Example 1 | >420 |

Table 1 illustrates superior wetting of Comparative Example 2. Comparative Example 1 performed poorly.

Comparative Example 4

70—Sorbitol 14000 40/20/40 block
5—Syn Lube 6485
25—Syn Fac 8808 (Available from Milliken and Company)

The impact of humectant on plant health under water stress was evaluated. Impatiens flowering plants were purchased from a local garden center and separated from one another. Dead leaves were trimmed from them. The flowers were documented with a photograph in order to capture their appearance. They were watered with 50 mL of a 0.5-0.7% solution of a formulation containing a multi-branched polymer wetting agent (in a star configuration), a non-ionic surfactant, and an inert diluent (Comparative Example 4). The concentration of the solution was normalized such that the concentration of wetter in the final solution was 0.5%. Another set of plants was treated with a 0.5% solution of Example 1. Water alone and Comparative Example 1 were used as controls.

The water was drained through the bottom of the pot until all dripping stopped and the pots were placed in randomized locations within a growth chamber at 80° F. and 50% relative humidity. The plants were watered with 75 g of water once a week. Every week, new photographs were taken. When compared after a month, the plants that had been treated with the horticulture additive of Example 1 (blend of multi-branched polymer wetting agent in a star configuration and humectant) showed fuller growth, greener leaves, and more flowers, indicating superior plant health when compared with Comparative Example 1 or Comparative Example 4.

Comparative Example 5

The effect of various humectants on moisture gain was evaluated. An empty aluminum pan was tared and 1-2 grams of the sample was placed in the pan. The pan was reweighed to determine the exact mass of sample. The pans were placed in a chamber with controlled temperature and humidity at 90° F. and 80% relative humidity for 1 week. The samples were reweighed and the % moisture gain was determined by dividing the final mass by the original mass and subtracting 100%. The % moisture gains can be seen in Table 2 below.

TABLE 2

Comparison of Humectants on Moisture Gain

| Humectant | % Moisture Gain |
|---|---|
| Corn Syrup (42-43) | 16.18 |
| Corn Syrup (62-43) | 20.08 |
| PEG 400 | 23.75 |
| PEG 8000 | 1.54 |
| Propoxylated Polyol | 8.55 |
| Ethoxylated Polyol | 12.50 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A horticulture additive formulation comprising:
   (a) a wetting agent, wherein the wetting agent is a multi-branched star polymer comprising an oxygen-containing or nitrogen-containing polyfunctional base compound and at least three branches attached thereto, wherein at least one branch includes at least one hydrophilic and one hydrophobic constituent, and
   (b) a humectant.

2. The horticulture additive formulation of claim 1, wherein the humectant is selected from the group consisting of glycerin, saccharides, substituted and unsubstituted poly(ethylene glycol), polyol alkoxylates, neutralized polyacrylic acids, polyacrylamides, polysaccharides, poly(propylene glycols), and mixtures thereof.

3. The horticulture additive formulation of claim 2, wherein the humectant is polyethylene glycol.

4. The horticulture additive formulation of claim 3, wherein the polyethylene glycol is characterized by having a molecular weight in the range from about 200 to about 5000.

5. The horticulture additive formulation of claim 3, wherein the polyethylene glycol is characterized by having a molecular weight in the range from about 200 to about 1000.

6. The horticulture additive formulation of claim 3, wherein the polyethylene glycol is characterized by having a molecular weight in the range from about 200 to about 800.

7. The horticulture additive formulation of claim 3, wherein the polyethylene glycol is characterized by having a molecular weight in the range from about 300 to about 600.

8. The horticulture additive formulation of claim 3, wherein the polyethylene glycol is characterized by having a molecular weight of approximately 400.

9. The horticulture additive formulation of claim 1, wherein the formulation further includes at least one compound that actively lowers the surface tension of water.

10. The horticulture additive formulation of claim 9, wherein the at least one compound that actively lowers the surface tension of water is a surfactant.

11. The horticulture additive formulation of claim 9, wherein the at least one compound that actively lowers the surface tension of water is selected from the group consisting of alkoxylated alcohols, alkoxylated fatty acids, alkoxylated fatty amines, alkoxylated fatty amides, phosphated fatty alcohols, sulfated fatty alcohols, phosphated ethoxylated fatty alcohols, sulfated ethoxylated fatty alcohols, alkylpolyglycosides, alkoxylated alkylphenols, alkoxylated naphthols, silicone surfactants, fluorocarbon surfactants, and mixtures thereof.

12. The horticulture additive formulation of claim 1, wherein the hydrophobic constituent is selected from the group consisting of alkylene oxide, polyalkylene oxide, alkyl ether, aryl ether, heteroaryl ether, alkyl ester, aryl ester, and mixtures thereof.

13. The horticulture additive formulation of claim 12, wherein the hydrophobic constituent is polyalkylene oxide.

14. The horticulture additive formulation of claim 13, wherein polyalkylene oxide is selected from the group consisting of propylene oxide, butylene oxide, and mixtures thereof.

15. The horticulture additive formulation of claim 1, wherein the wetting agent is a multi-branched polymer comprising an oxygen-containing polyfunctional base compound.

16. The horticulture additive formulation of claim 15, wherein the oxygen-containing polyfunctional base compound is selected from the group consisting of polyol, polycarboxylic acid, lactone, and mixtures thereof.

17. The horticulture additive formulation of claim 1, wherein the hydrophilic constituent is a polyalkylene oxide moiety.

18. The horticulture additive formulation of claim 17, wherein the polyalkylene oxide moiety is ethylene oxide.

19. The horticulture additive formulation of claim 1, wherein the wetting agent is a multi-branched polymer comprising a nitrogen-containing polyfunctional base compound.

20. The horticulture additive formulation of claim 19, wherein the nitrogen-containing polyfunctional base compound is selected from the group consisting of ammonia, ethylene diamine, diethylene triamine, trimethylene tetramine, tetraethylene pentaamine, pentaethylene hexamine, linear polyethyleneimine, branched polyethyleneimine, polyvinylamine, and mixtures thereof.

21. The horticulture additive formulation of claim 1, wherein the formulation further includes a compatibilizer.

22. The horticulture additive formulation of claim 21, wherein the compatibilizer is selected from the group consisting of water, alcohols, glycerin, propylene glycol, dipropylene glycol, polypropylene glycol, ethylene glycol, diethylene glycol, polyethylene glycol, alkoxylated polyols, and organic solvents and mixtures thereof.

23. The horticulture additive formulation of claim 1, wherein at least one branch is capped with a functional group selected from the group consisting of ethers, esters, halogens, sulfonates, phosphates, carboxymethylates, alkyl, alkyl oxide, aryl, aryl oxide, and mixtures thereof.

24. A system for improving the health/survival of a plant, the system comprising the horticulture additive formulation of claim 1, a planting medium, and at least one plant contained within the planting medium.

25. A planting medium containing the horticulture additive formulation of claim 1.

26. A method for improving plant health/survival comprising the steps of:
   (a) Providing the horticulture additive formulation of claim 1,
   (b) Providing at least one plant, wherein the at least one plant is contained within a planting medium, and
   (c) Applying the horticulture additive formulation to the planting medium.

27. The method of claim 26, wherein the planting medium is a soilless mixture.

28. The method of claim 27, wherein the soilless mixture is peat.

\* \* \* \* \*